(12) United States Patent
Nilsson (10) Patent No.: US 10,384,685 B2
(45) Date of Patent: Aug. 20, 2019

(54) METHOD AND DEVICE FOR OPERATING A POWERTRAIN OF A MOTOR VEHICLE

(71) Applicant: VOLVO TRUCK CORPORATION, Göteborg (SE)

(72) Inventor: Ola Nilsson, Varberg (SE)

(73) Assignee: Volvo Truck Corporation, Göteborg (SE)

( * ) Notice: Subject to any disclaimer, the term of this patent is extended or adjusted under 35 U.S.C. 154(b) by 129 days.

(21) Appl. No.: 15/536,067

(22) PCT Filed: Dec. 19, 2014

(86) PCT No.: PCT/EP2014/025029
§ 371 (c)(1),
(2) Date: Jun. 14, 2017

(87) PCT Pub. No.: WO2016/095941
PCT Pub. Date: Jun. 23, 2016

(65) Prior Publication Data
US 2017/0341656 A1 Nov. 30, 2017

(51) Int. Cl.
*B60W 30/20* (2006.01)
*F16D 48/00* (2006.01)
(Continued)

(52) U.S. Cl.
CPC .......... *B60W 30/20* (2013.01); *B60W 10/02* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS

| 8,831,847 | B2 | 9/2014 | Winkelmann et al. |
| 2004/0224821 | A1 * | 11/2004 | Hausner ............ B60T 8/00 477/182 |
| 2007/0261932 | A1 | 11/2007 | Zagrodzki et al. |

FOREIGN PATENT DOCUMENTS

| CN | 102777590 A | 11/2012 |
| CN | 103195841 A | 7/2013 |

(Continued)

OTHER PUBLICATIONS

Japanese Official Action (dated Oct. 10, 2018) for corresponding Japanese Application 2017-532759.

(Continued)

*Primary Examiner* — Timothy Hannon
(74) *Attorney, Agent, or Firm* — WRB-IP LLP (57) ABSTRACT

A method and device for operating a powertrain of a motor vehicle are provided, wherein the powertrain includes an internal combustion engine, a transmission and a friction clutch arranged there between in order to control a power flow between the internal combustion engine and the transmission. The method includes the steps of detecting clutch judder, analyzing clutch judder, and determining a type of clutch judder. Based on determined type of clutch judder the method further includes selecting a udder countermeasure from a number of predetermined judder countermeasures and executing selected judder countermeasure. Detected clutch judder can be taken care of in an efficient way and future clutch judder may be prevented.

8 Claims, 6 Drawing Sheets

(51) Int. Cl.
*F16D 48/08* (2006.01)
*B60W 10/02* (2006.01)
*B60W 10/06* (2006.01)
*B60W 10/10* (2012.01)
*B60W 30/186* (2012.01)

(52) U.S. Cl.
CPC ........... *B60W 30/186* (2013.01); *F16D 48/00* (2013.01); *F16D 48/08* (2013.01); *B60W 2030/203* (2013.01); *B60W 2300/10* (2013.01); *B60W 2300/12* (2013.01); *B60W 2300/17* (2013.01); *B60W 2510/0283* (2013.01); *B60W 2510/0638* (2013.01); *B60W 2510/104* (2013.01); *B60W 2510/1015* (2013.01); *B60W 2520/105* (2013.01); *F16D 2500/106* (2013.01); *F16D 2500/108* (2013.01); *F16D 2500/1045* (2013.01); *F16D 2500/10412* (2013.01); *F16D 2500/304* (2013.01); *F16D 2500/3067* (2013.01); *F16D 2500/30415* (2013.01); *F16D 2500/3112* (2013.01); *F16D 2500/50242* (2013.01); *F16D 2500/50293* (2013.01)

(56) References Cited

FOREIGN PATENT DOCUMENTS

| | | |
|---|---|---|
| CN | 103438205 A | 12/2013 |
| DE | 10026224 A1 | 11/2000 |
| DE | 10229317 A1 | 1/2004 |
| EP | 0845616 A2 | 6/1998 |
| EP | 1447582 A2 | 8/2004 |
| EP | 2161471 A1 | 3/2010 |
| EP | 2749756 A1 | 7/2014 |
| JP | H10159872 A | 8/1998 |
| JP | H10311418 A | 11/1998 |
| JP | H11351276 A | 12/1999 |
| JP | 2001330138 A | 11/2001 |
| JP | 2010060635 A | 3/2010 |
| JP | 2010196810 A | 9/2010 |
| KR | 2014002779 A | 3/2014 |
| WO | 2013077049 A1 | 5/2013 |

OTHER PUBLICATIONS

International Search Report (dated Aug. 31, 2015) for corresponding International App. PCT/EP2014/025029.

International Preliminary Report on Patentability (dated Nov. 22, 2016) for corresponding International App. PCT/EP2014/025029.

Chinese Official Action (dated Sep. 5, 2018) for corresponding Chinese App. 201480084198.4.

* cited by examiner

METHOD AND DEVICE FOR OPERATING A POWERTRAIN OF A MOTOR VEHICLE

BACKGROUND AND SUMMARY

The present disclosure relates to a method for operating a powertrain of a motor vehicle in order to improve the driveability of the vehicle. The present disclosure may be applied in heavy duty vehicles, such as trucks, buses and construction equipment. Although the disclosure will be described with respect to a heavy duty vehicle, the disclosure is not restricted to this particular use but may also be used in other vehicles such as e.g. passenger cars.

Vehicles equipped with either manual or automatic transmissions using friction clutch may during the engagement of the friction clutch at vehicle take-off experience a phenomenon often referred to as clutch judder. Clutch judder appears at vehicle system oscillations at approximately 5 to 20 Hz. Clutch judder may originate from various sources and is influenced by many components of the vehicle, but the fundamental cause of the occurrence of clutch Judder is that oscillations occurring during the engagement of the friction clutch correspond to the resonance frequency of the currently engaged gear. Clutch judder significantly affects the driveability and the driver comfort of the vehicle and if the clutch judder is sever it may even make concerned vehicle undrivable. Also, reoccurring, sever clutch judder may be harmful the vehicle.

Today most solutions to clutch judder related problems are focusing on suppressing the oscillations by e.g. using damping materials. However, the damping effect of using materials often decay over time, thus such solutions are only temporarily.

US 2005/0189192 discloses a method for reducing juddering vibrations. According to US 2005/1089192 the judder is detected by analysing rotational speed of e.g. a transmission input shaft. The judder is subsequently rectified by automatic adjustment of a device being disposed in the drivetrain, or coupled thereto, in such a manner that a rotary parameter, such as torque or speed, which is assigned to a drivetrain component, is modified. However, in US 2005/0189192, and in other related prior art, no measures are taken in order to identify the origin of the clutch judder. Thus, no preventive or long term lasting countermeasures are performed. The countermeasures proposed are often quite general and not that effective.

Thus, there is a need of further improvements.

It is desirable to provide a method for improving the driveability of a vehicle it is also desirable to improve the durability of the vehicle.

During engagement of a friction clutch at take-off, various sources, which are dependent on various vehicle configurations, may cause oscillations in the vehicle powertrain. If such oscillations coincide with the resonance frequency of the powertrain of the vehicle, at the current gear, this may cause clutch judder. Clutch judder has strong negative impact on the driveability of the vehicle, which may be dangerous, and may also, especially if occurring over a long period of time, be harmful for the vehicle and/or vehicle components.

A method for operating a powertrain of a motor vehicle at take-off thus during the engagement of a friction clutch, will be presented. The powertrain comprises an internal combustion engine, a transmission and the friction clutch arranged there between in order to control a power flow between the engine and the transmission.

The method comprises the steps of:
detecting clutch judder, wherein the detection of clutch judder is based on at least one predetermined vehicle variable,
analysing clutch judder characteristics by evaluating the at least one predetermined vehicle variable in order to:
determining a type of clutch judder,
selecting a judder countermeasure, based on determined type of clutch judder, from a number of predetermined judder countermeasures, and
executing selected judder countermeasure.

The clutch judder characteristics are the variation in rotational speed of e.g. an input shaft over time caused by the clutch judder. The present disclosure has the effect that by continuously detecting clutch judder, and determining the type of clutch judder, the judder countermeasures, hereafter referred to as simply countermeasures, taken may be dependent on the source of the clutch judder. Thereby the most efficient countermeasure may be executed and clutch judder may be avoided in the future.

Clutch judder may be detected by analysing when there is a reoccurring irregularity in at least one predetermined vehicle variable, and wherein said irregularity exceeds a predetermined threshold value. The threshold value may e.g., be set according to when the clutch judder is experienced as annoying by a driver or when there is an imminent risk that the judder may cause premature wear of the powertrain if it persists over time. The threshold value is preferably also set in respect to what predetermined vehicle variable that is analysed. If clutch judder is detected the type of clutch judder may be determined by analysing the clutch judder characteristics wherein that most suitable countermeasure may be executed.

The method, including all the method steps, is run by an Electronic Control Unit (ECU) of the vehicle and is controlled by the software of the ECU. When referring to that the method is performed by an ECU this is not limited to that the method is performed by one single control unit The method may be performed by a distributed control unit comprising numerous interacting control units and local controllers of the vehicle. This is also referred to as the computer of the vehicle. A computer is by definition a programmable electronic device that can retrieve, store, process and redistribute information, thus the same operations as the control unit, being a single component or a network of interacting components, is provided to perform.

Further, In an exemplary embodiment the method may be run continuously during vehicle take-off, meaning that the method step of detecting, and possibly also the following method steps, are carried out as the friction clutch is being engaged. An exemplary embodiment of the method may be adaptive. This means that when clutch judder is detected, which triggers that a clutch judder countermeasure is executed, the specific vehicle operating conditions are also logged wherein next time the vehicle is about to operate at similar operating conditions countermeasures may be performed in advance or operating at the specific operating conditions where clutch judder previously has occurred may be avoided.

According to an exemplary embodiment of the present disclosure the one predetermined vehicle variable is a rotational speed of a power transferring part in the powertrain. According to another exemplary embodiment the predetermined vehicle variable may be vehicle acceleration or oscillations of some other part of the powertrain or the vehicle.

According to another exemplary embodiment of the present invention the predetermined vehicle variable used in the method step of detecting clutch judder may be acceleration and/or inclination Input provided by e.g. an acceleration sensing means or inclination sensing means. However, even if acceleration and/or inclination is used in the method step of detecting clutch judder a predetermined vehicle variable such as rotational speed of a power transferring part the powertrain may be used in the subsequent method steps of analysing clutch judder and determining type of clutch judder.

According to exemplary embodiment of the disclosure this power transferring part of the powertrain is an input shaft of the transmission. Examples of other power transferring parts of the powertrain for which the rotational speed may be analysed is any gear wheel, a main, counter or an output shaft, a drive axle or the wheels. If the rotational speed of e.g. the input shaft temporarily decreases each time the rotating shaft is in a particular position, this may be an Indication of the occurrence of clutch judder. It is possible to analyse the rotational speed of either one of the moving parts which are involved in the transfer of power from the engine to the wheels. However, depending on for which moving part of the powertrain the rotational speed is analysed compensation for difference in gear ratio in relation to the input shaft may have to be applied. Thus, as long as the rotational speed of a part involved in the transfer of power from the engine to the transmission can be directly coupled to rotational speed of the input shaft, and the gear ratio relation to the input shaft can be determined, that part can be analysed in order to detect clutch judder. For a multi clutch transmission a moving part which is involved irrespectively of which of the clutches that are engaged, or the speed of a moving component of each clutch, may be used when analysing the rotational speed. Advantageously the speed of one power transferring part, such as e.g. a shaft of the transmission, which is provided with a rotational speed sensor used for additional purposes, such as OBD, On Board Diagnostics etc., is used.

The power transferring part in the powertrain may preferably be one of the shafts of the transmission, e.g., the main, counter, output or input shaft.

According to yet an exemplary embodiment of the present disclosure the determination of a type of clutch judder is based on a clutch judder frequency. By assessing the clutch judder frequency in relation to at least one predetermined vehicle variable it is possible to identify the origin of the clutch judder and thus determine the type of clutch judder. Clutch judder frequency is defined as the frequency of the judder and is further discussed in relation to FIG. 3a-3d.

The most suitable countermeasure in order to rectify respective type of clutch judder is dependent on the type of clutch judder, in the following disclosure a few different types of clutch judder, with exemplary countermeasures suitable for respective type of clutch judder, will be disclosed.

According to one example the method step of determining type of clutch judder further comprises the method steps of:
  comparing the clutch judder frequency with an engine frequency, and
  evaluating if the clutch judder frequency matches the engine frequency or matches half the engine frequency.

In the subsequent method step it is determined that if the clutch judder frequency matches the engine frequency, or half the engine frequency, at the current gear the clutch judder Is engine related. If the judder only occurs on certain gears this may also be an indication of that the clutch judder is engine related.

If the clutch judder frequency matches the engine rotational speed frequency, thus if the frequency derived from rpm (revolutions per minute) of the engine is equal to the resonance frequency of the current gear, it is possible that the clutch judder is related to hardware participating; in each revolution of the engine, e.g. the clutch judder may be related to the rotation of the crankshaft. If the clutch judder frequency matches half the engine frequency it is instead possible that the clutch judder is related to one single cylinder. Each time that single cylinder ignites, which is once per every second revolution of the engine, something occurs which in some way induce clutch judder. This may e.g. be due to misfire of said cylinder or that more or less fuel is injected into that cylinder than into other cylinders.

If it is determined that the clutch judder is related to the engine, exemplary countermeasures may be that the ECU automatically increases the rotational speed of the engine when starting on a gear where clutch judder has been detected or, if possible, avoid starting such gears completely. A predetermined maximum level of starting rotational speed may be necessary in order to protect the clutch and related components and to not deteriorate the driver comfort.

As will be discussed more in detail later, the friction clutch also comprises a pressure plate and the powertrain comprises a flywheel. According to a second example the method step of determining a type of clutch judder comprises the steps of:
  comparing the clutch judder frequency with a rotational speed difference frequency which is dependent on a rotational speed difference between the rotational speed of a power transferring part in the powertrain and the rotational speed of the engine, and
  evaluating if the clutch judder frequency matches the rotational speed difference frequency.

The power transferring part may e.g. be the input shaft or any other shaft currently involved in the transferring of power. Depending on what power transferring part that is used as reference to the rotational speed of the engine when determining the rotational speed difference frequency it may be necessary to compensate for difference in gear ratio between the power transferring part and the input shaft. Thus, the rotational speed difference frequency is defined as the frequency derived from the difference in rotational speed between the rotational speed of the engine and the rotational speed of the input shaft. If the rotational speed of an other power transferring part than the input shaft is used in order to determine the rotational speed difference frequency a difference in gear ratio between power transferring part and the input shaft may have to be applied.

Figure 4A:
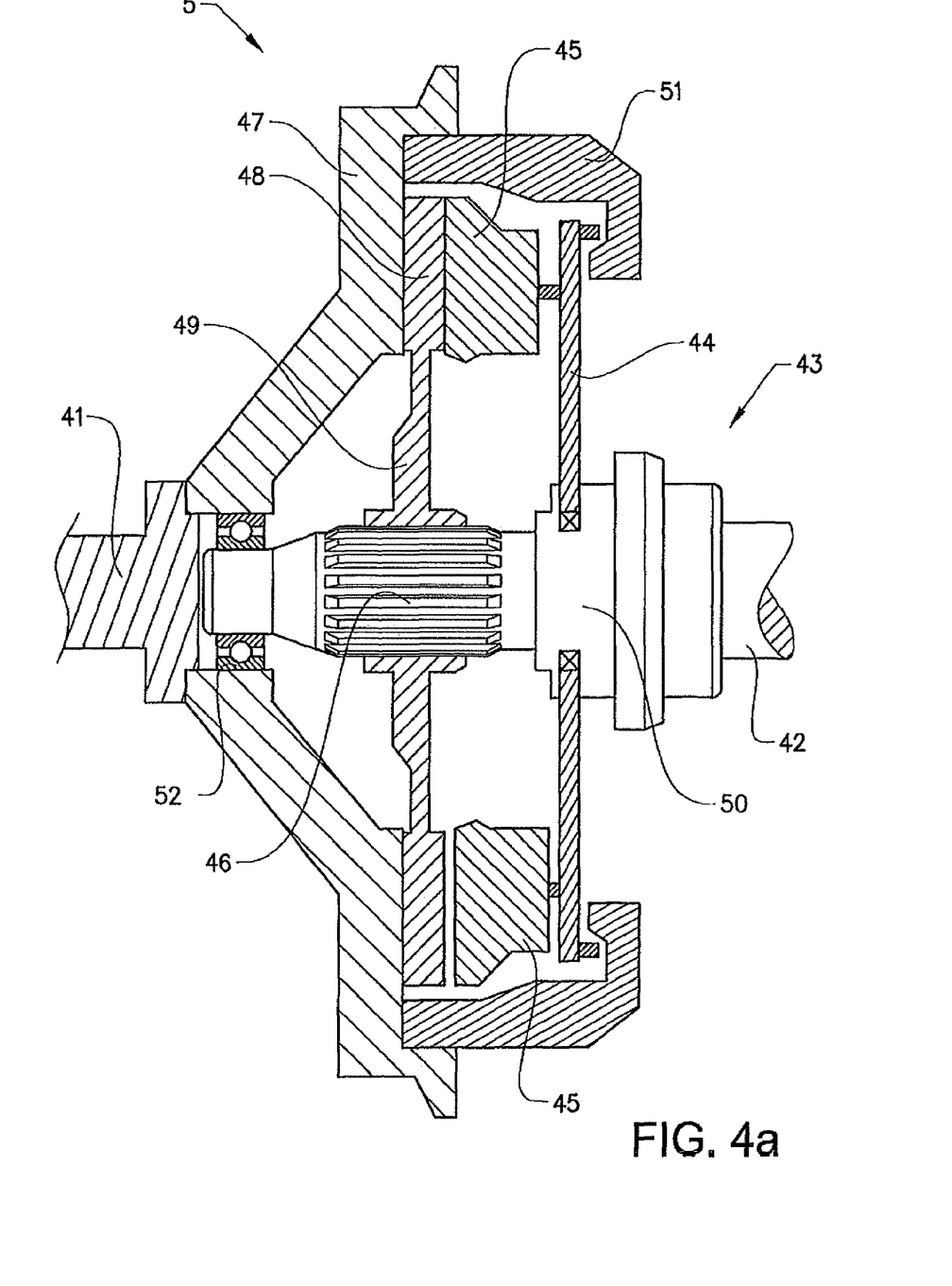
Figure 4B:
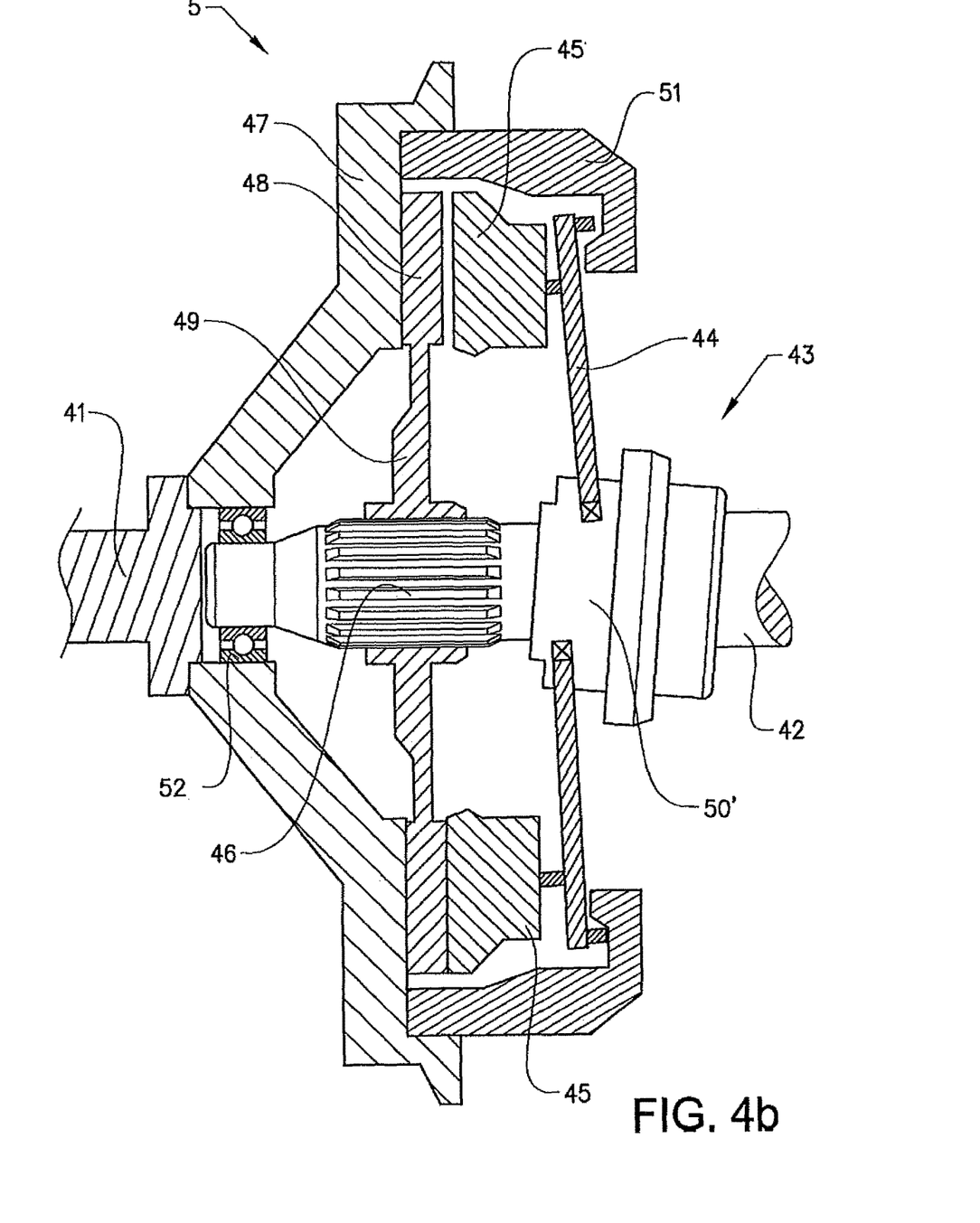

In the method step where the type of clutch judder is determined it Is determined that if the clutch judder frequency matches the rotational speed difference frequency the clutch judder is related to the angular tolerance between the pressure plate and the flywheel of the clutch of the vehicle. When a friction clutch, which will be described in detail in relation to FIGS. 4a and 4b, is engaged during vehicle take-off, e.g. by that a driver releases the clutch, the pressure plate of a releasing means is configured to act on a friction plate, such that the friction plate engage with a flywheel of a crankshaft. The friction plate is connected to an input shaft and by engaging the flywheel of the crankshaft with the friction plate of the input shaft the input shaft and the crankshaft are engaged such that rotational power (torque) can be transferred from the crankshaft to the input shaft. Clutch judder related to the angular tolerance between the pressure plate and the flywheel may e.g. be caused by machining variations or displacement due to external force.

If so, this causes the friction plate and the flywheel to unintentionally engage, or engage to a higher extent than what is expected, at a certain point during rotation of the pressure plate. This may cause oscillations of the powertrain. If these oscillations match the resonance frequency of the current gear this may cause clutch judder.

If the clutch judder frequency matches the rotational speed difference frequency it can be determined that the clutch judder may be related to the angular tolerance between the pressure plate and the flywheel. It may thereby be possible to minimize the clutch judder problem by avoiding take-off on the gear on which the clutch judder appears, which at least will reduce the number of times the driver is subjected to clutch judder. When starting on a gear where clutch judder occurs cannot be avoided the problem can be minimized by passing the critical rpm as quickly as possible.

Further, the friction clutch comprises a release bearing and a diaphragm spring, which also will be disclosed more in detail later. According to a third example the method step of determining a type of clutch judder comprises the steps of:

comparing the clutch judder frequency with the rotational speed of a power transferring part in the powertrain, and evaluating if the clutch judder frequency matches the rotational speed of the power transferring part in the powertrain.

In the subsequent method step, where the type of clutch judder is determined, it is determined that if the clutch judder frequency matches the rotational speed of the power transferring part in the powertrain the clutch judder is related to the angular tolerance between the release bearing and the diaphragm spring. The economically realizable tolerances may during certain conditions, such as e.g. if the current vehicle as such is particularly sensitive to clutch judder, not be sufficient. Another reason may be that a number of related tolerance intervals interact in an unfavorable way. A deficiency in the angular tolerance between the release bearing and the diaphragm spring may result in that the flywheel and the pressure plate are not parallel. This may also be caused by errors when manufacturing or assembling components. Not parallel flywheel and pressure plate may result in that the friction plate is not evenly engaged to the flywheel when the pressure plate acts on the friction plate during engagement of the clutch. Uneven engagement of the friction plate and the flywheel may cause oscillations in the powertrain, and if these oscillations correspond to the resonance frequency of the current gear this may cause clutch judder.

Exemplary countermeasures if the clutch judder frequency matches the rotational speed of the power transferring part in the powertrain are the same as if the clutch judder frequency matches the rotational speed difference frequency, i.e. avoiding take-off on concerned gear and secondly by passing the critical rpm as quickly as possible.

In order to determine that clutch judder origin either from the angular tolerance between a pressure plate and a flywheel or from the angular tolerance between the release bearing and the diaphragm spring it may also be Important to analyse at what rpm and at what time from vehicle take-off the clutch judder start and at what rpm and at what time from vehicle take-off the clutch judder stops. This may also be used as an indication when determining type of clutch judder.

According to a fourth example, subsequent to the engagement of the friction clutch of the powertrain has been initiated, the method step of determining a type of clutch judder comprises the method sub steps of:

evaluating whether, during the engagement of the friction clutch, the highest rotational speed acceleration of a power transferring part in the powertrain started from zero rotational speed, and evaluating whether the clutch judder is engine related.

In the following step here the type of clutch judder is determined it can further be concluded that;

if it is determined that the clutch judder was not engine related, and if the highest rotational speed acceleration of the analysed power transferring part in the powertrain started at zero rotational speed the clutch judder is related to the engagement of the friction clutch.

If it is determined that the clutch judder was related to the engagement of the friction clutch this can be avoided during subsequent vehicle take-offs by minimizing the torque peak. This can be achieved by adjusting the clutch starting position or by simply reducing the speed at which the clutch is engaged, thus increase the time during which the clutch is engaged. Normally, engagement related clutch Judder is damped out with time.

Thus, the selected clutch judder countermeasure may be selected from a group of judder countermeasures comprising:

increasing rotational speed of the engine during a take-up period, avoiding starting on specific gears, adjusting the rotational speed at which the clutch is engaged, adjusting clutch starting position, and/or passing critical engine rotational speeds wherein selected countermeasure is dependent on the determined type of clutch judder and what the origin of respective type of judder is.

Many vehicles of today are equipped with an acceleration sensing means and/or an inclination sensing means configured to measure acceleration over time, such as an accelerometer or like. Assessing the clutch judder frequency in relation to at least one predetermined vehicle variable is sufficient in order to detect and classify clutch judder. However, just by assessing clutch judder frequency in relation to at least one predetermined vehicle variable It may not be possible to assess how sever the clutch judder is. Thus, for vehicles equipped with an acceleration sensing means and/or inclination sensing means, when, clutch judder is detected the method of the present disclosure may further comprises the steps of;

collecting information from the acceleration sensing means and/or the inclination sensing means of the vehicle, combining information from the acceleration sensing means and/or inclination sensing means with clutch judder characteristics, wherein the clutch judder characteristics are given by evaluating the clutch judder frequency over time, and evaluating the criticality of the clutch judder.

By evaluating the criticality, or how sever the clutch judder is, it is possible to identify operation modes where clutch judder may be present but where it may not, by assessing the operation mode as a whole, be noticeable from a driveability or durability aspect. Also, the criticality of the clutch judder may determine what countermeasure that is suitable at respective occasion.

The present disclosure also comprises a computer program comprising program code means for performing the steps of any exemplary embodiments of the method of the present disclosure when said program is run on a computer such as an ECU. The present disclosure also comprises a computer readable medium carrying a computer program comprising program code means for performing the steps of any embodiment of the method when said program product is run on a computer such as an ECU. Further, the present disclosure comprises an ECU in accordance to what previously has been disclosed for controlling any embodiment of the method of operating a powertrain, wherein the ECU is configured to perform the steps of any embodiment of the method.

Further effects and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

DETAILED DESCRIPTION

Figure 1:
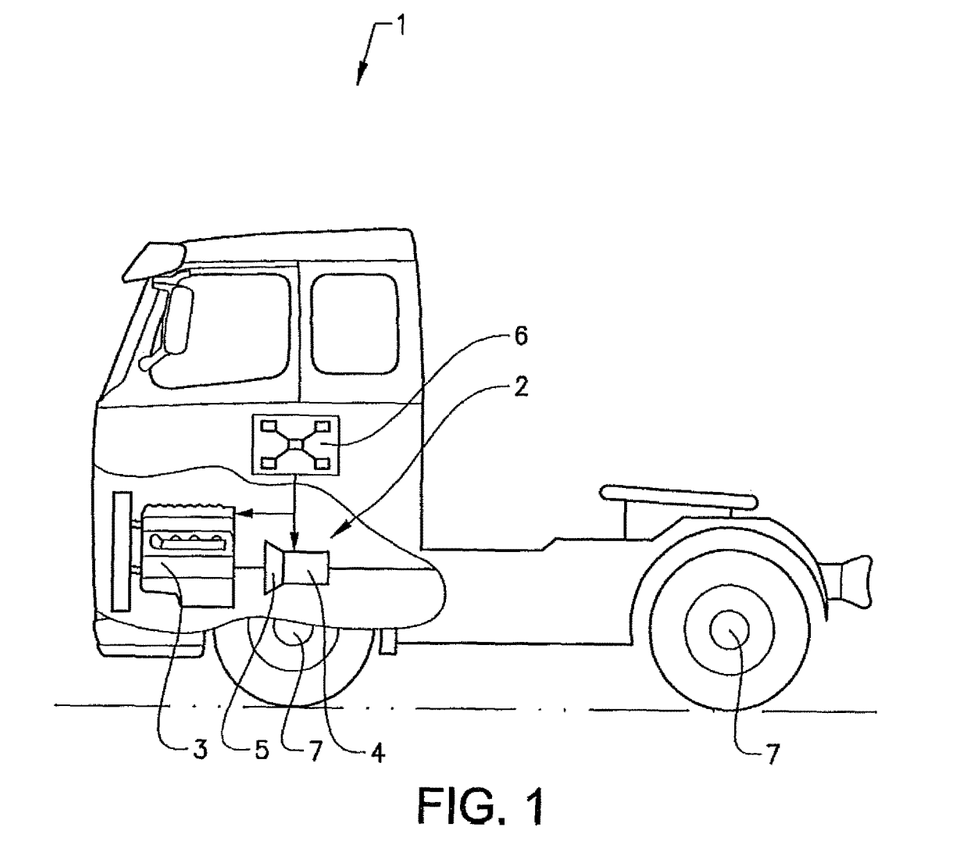
FIG. 1 discloses a schematic view of a heavy duty vehicle.

FIG. 1 discloses a schematic view of a heavy duty vehicle 1. The heavy duty vehicle 1 comprises an electronic control unit (ECU) 6 and a powertrain 2, wherein the powertrain 2 in turn comprises, an internal combustion engine 3 and a transmission 4 with a friction clutch 5. The transmission 4 and the friction clutch 5 are arranged to the engine 3 such that the power transferred from the engine 3 to wheels 7 of the heavy duty vehicle 1 can be controlled. The operations of the engine 3, the transmission 4 and the friction clutch 5 are controlled by the ECU 6.

Figure 2:
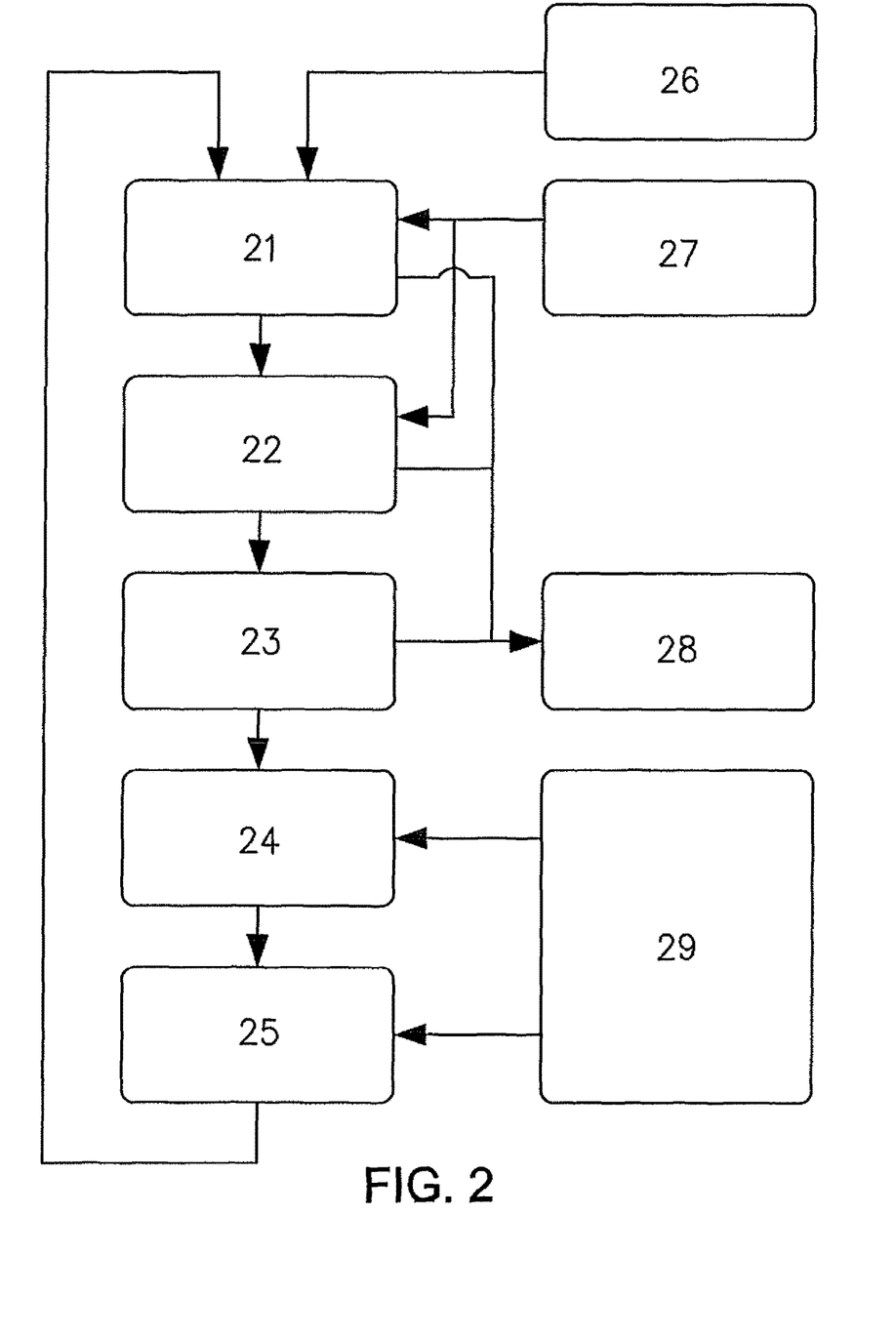
FIG. 2 discloses a schematic flow-chart over the method of the present disclosure, FIG. 3a-3d disclose time vs. rpm graphs schematically disclosing clutch judder characteristics for different types of clutch judder, and FIGS. 4a and 4b disclose schematic views of a friction clutch.

FIG. 2 discloses a schematic flow-chart over a method of the present disclosure which may be implemented for a heavy duty vehicle 1 as disclosed in FIG. 1 at take-off.

Clutch judder generally occurs when a driveline oscillation coincide with the resonance frequency of the powertrain at the current gear. Clutch judder severely deteriorates the driveability of the vehicle and may also cause premature wear of the powertrain.

According to the embodiment of the present disclosure disclosed in FIG. 2 the method is initiated by a detecting clutch judder operation 21. In order to detect clutch judder a predetermined threshold value 26 is provided as input to the operation. The predetermined threshold value 26 is set as a variation of at least one predetermined vehicle variable 27 provided from suitable sensing means such as e.g. a rotational speed sensor, a vehicle acceleration sensing means or a vehicle inclination sensing means. If a detected predetermined vehicle variable 27 variation exceeds said set predetermined threshold value 26, expressing an acceptable variation, clutch judder is detected. The predetermined threshold value 26 may be set e.g. in respect to what is considered to be acceptable judder by a driver or in respect to when there is an imminent risk of e.g. premature wear, impaired safety or impaired driveability due to judder. The predetermined vehicle variable 27 is also provided as input to the detecting clutch judder operation 21 and, may be e.g., the rotational speed of a power transferring part of the powertrain 2, such as the rotational speed of an input shaft 42, or input from a vehicle acceleration or inclination sensing means.

If clutch judder is detected the variation of the at least one predetermined vehicle variable 27 is analysed in an analysing clutch judder operation 22. In the analysing clutch judder operation 22 the clutch judder characteristics, such as e.g. clutch judder frequency, are used, wherein the clutch judder characteristics may be matched against known clutch judder characteristics in carder to determine what type of clutch judder, and based on that the origin of the clutch judder, that has been detected. Please note that if e.g. an acceleration sensing means or an inclination sensing means has been used as the predetermined vehicle variable 27 in the detect clutch judder operation 21, it may be necessary to use another predetermined vehicle variable 27 in the analysing clutch judder operation 22 in order to provide the clutch judder characteristics.

Based on the clutch judder analysis operation 22 the type of clutch judder is subsequently determined in a determining clutch judder operation 23. The determined type of clutch judder and the at least one predetermined vehicle variable 27 is logged in a logging occurrence of clutch judder operation 28. The logged clutch judder information may subsequently be used to avoid the occurrence of clutch judder, by executing suitable countermeasure and/or avoid certain driving modes, also in the future. Also other vehicle information, driving conditions etc., such as e.g. current gear and driver requests, may be logged together with the detected clutch judder in order to be able to make the best possible clutch judder predictions in the future.

When the type of clutch judder has been determined at least one of a number of judder countermeasures is selected from a group of judder countermeasures 29 comprising e.g. skipping critical gears or passing critical engine rotational speeds quickly. The selection of suitable countermeasure is executed in a selecting countermeasure operation 24, wherein subsequently the selected countermeasure is executed in an executing countermeasure operation 25.

The method is subsequently repeated wherein if clutch judder still is detected in the detecting clutch judder operation 21 the steps of the method is repeated wherein further countermeasures might be executed. Thus, after every correcting countermeasure executed due to clutch judder the ECU is evaluating the outcome of the measurement taken. The ECU continues to execute correcting countermeasures, within certain limits, until the clutch judder is below the predetermined threshold value. When clutch judder is not detected in the detecting clutch judder operation 21 only this method step is repeated until clutch judder is detected.

Clutch judder can be detected using the rotational speed sensors of any of the power transferring parts inside of the transmission 4. Most transmissions are equipped with rotational speed sensors on one or several of the shafts in the transmission 4, e.g. the main, counter, output and/or input shaft 42. Clutch judder can also be detected by using input from e.g. an acceleration sensing means or an inclination sensing means. The clutch judder is detected by analysing the changes or irregularities in e.g. rotational speed of e.g. an input shaft or acceleration during vehicle take-off. If the rotational speed of a power transferring part is used, depending on for which power transferring part, the rotational speed is analysed, a compensation of gear ratio may have to be applied.

By detecting and analysing the clutch judder, and based on said analysis determine the type of clutch judder and what countermeasure that is suitable in order to minimize or avoid further clutch judder, the driveability can be improved, as well as the durability. The method of the present disclosure minimizes and avoids clutch judder when such is detected as well as use Information from previous occurrences of clutch judder in order to prevent future clutch judder.

FIG. 3a-3d discloses four graphs showing time vs. rpm wherein clutch judder characteristics for four different types of clutch judder schematically is disclosed. Rotational speed where something is occurring every revolution can be described as having a certain frequency of occurrences. Thus, the engine rotational speed can thereby be expressed as a frequency. The clutch judder frequency is defined as the frequency of the judder and can be measured by measuring the frequency of irregularities in rotational speed of a power transferring part of the powertrain e.g. a shaft of the transmission. The characteristics of the clutch judder can be expressed as variations in rotational speed over time.

Figure 3A:
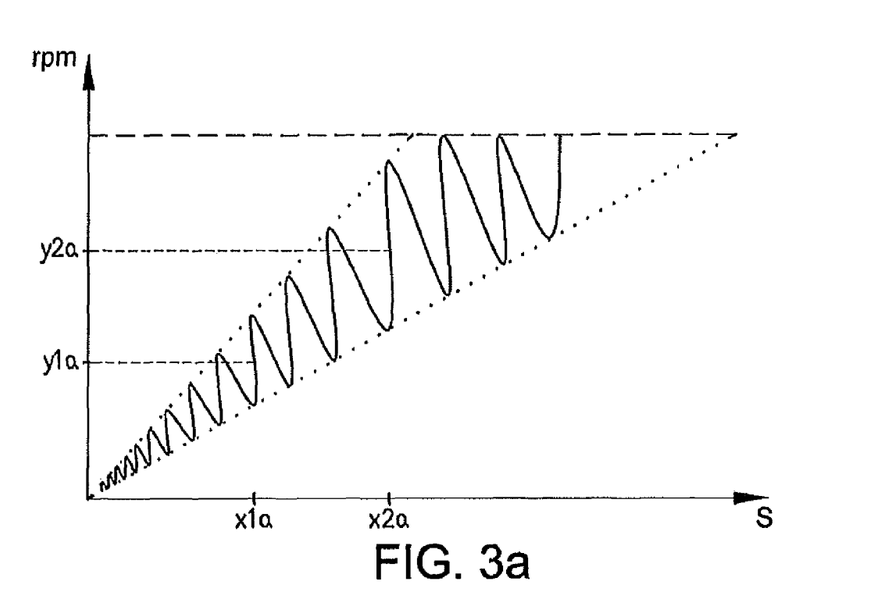

FIG. 3a discloses schematic clutch judder characteristics for a gear wherein the clutch judder starts at vehicle take-off and increases as the time and rpm increases. The clutch judder characteristics shown in FIG. 3a may be the characteristics of engine related clutch judder.

Engine related clutch judder may be identified by that the clutch judder frequency is essentially equal to, or essentially half as high as, the engine frequency. Generally, for an internal combustion engine each cylinder is fired once per every two revolution of the crankshaft. If the engine frequency and the clutch judder frequency is essentially the same this may be an indication of that the clutch judder is related to a hardware deficiency or like which is involved in every revolution of the crankshaft, thus affects every engine revolution. If the clutch/udder frequency is essentially half as high as the engine frequency this may be an indication that the clutch judder is related to one single cylinder.

To give an example: If the revolutions marked as y1a indicates an rpm of 960, which corresponds to an engine frequency of 16 Hz, and clutch judder frequency at x1a is 8 Hz, the clutch judder frequency is half of the engine frequency. This indicates that the clutch judder, at the current gear, is caused by something related to one of the cylinders. If it is determined that the clutch judder is related to one cylinder the clutch judder may be caused by that less or more power is developed at each stroke for that cylinder in relation to the other cylinders, e.g. due to that less or more fuel is injected into that cylinder before Ignition. Correspondingly, if y2a indicates 1800 rpm, which corresponds to an engine frequency of 30 Hz, and the clutch judder frequency at x2a is 15 Hz, also then the clutch judder frequency is half of the engine frequency.

Figure 3B:
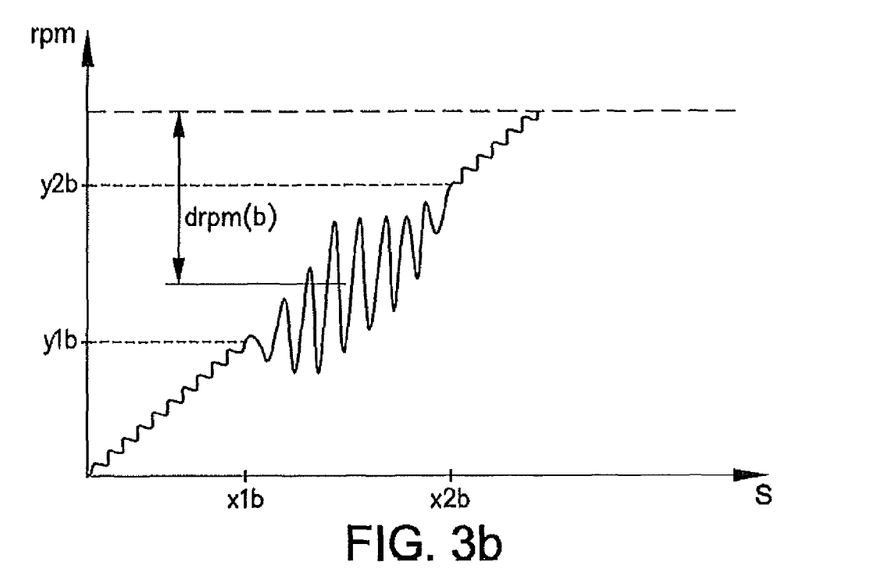
Figure 3C:
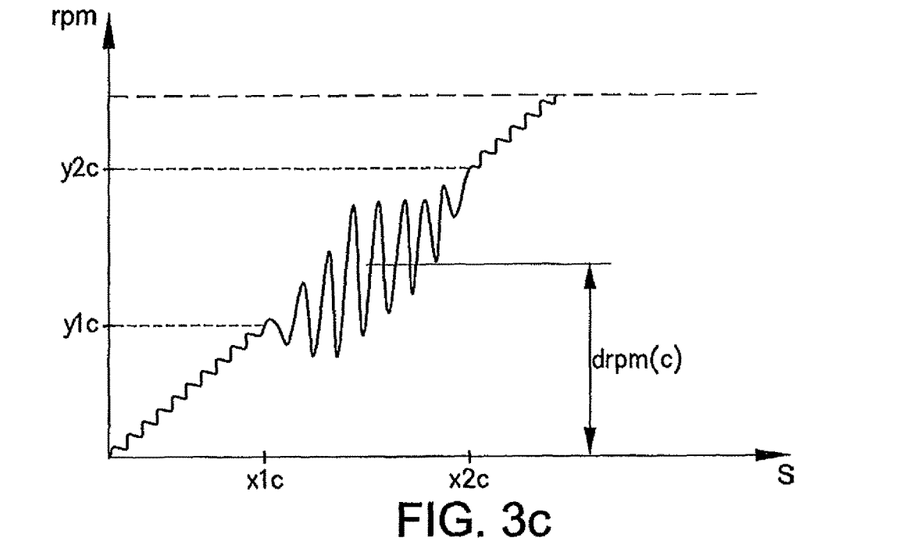

If the clutch judder frequency cannot be matched to the engine frequency the cause of the clutch judder is determined not to be related to the engine. FIGS. 3b and 3c disclose schematic clutch judder characteristics for given gears wherein respective clutch judder appears at a certain time after take-off x1b, x1c and rpm y1b, y1c and subsequently disappears at a later time after take-off x2b, x2c and rpm y2b, y2c. The clutch judder characteristics shown in FIGS. 3b and 3c may be the characteristics of clutch judder related to angular tolerances.

If the clutch judder frequency is matched to a first rotational speed difference drpm(b) between the rotational speed of a power transferring part of the powertrain, such as an input shaft 42, and an engine rotational speed the clutch judder may be related to the angular tolerance between a pressure plate 45 of a friction clutch 5 and a flywheel 47. If the rotational speed of another power transferring part of the powertrain than the input shaft 42, is analysed, a compensation of gear ratio between said other power transferring part and the input shaft 42 may have to be applied. Correspondingly, if a second rotational speed difference drpm(c), wherein the second rotational speed difference drpm(c) is the speed of a power transferring part of the powertrain 2 (or the difference between the rotational speed of a power transferring part and rpm), correspond to a frequency essentially equal to the resonance frequency of the powertrain 2 at current gear the clutch judder may be related to the angular tolerance between a release bearing 50 and a diaphragm spring 44 of a releasing means 43.

Figure 3D:
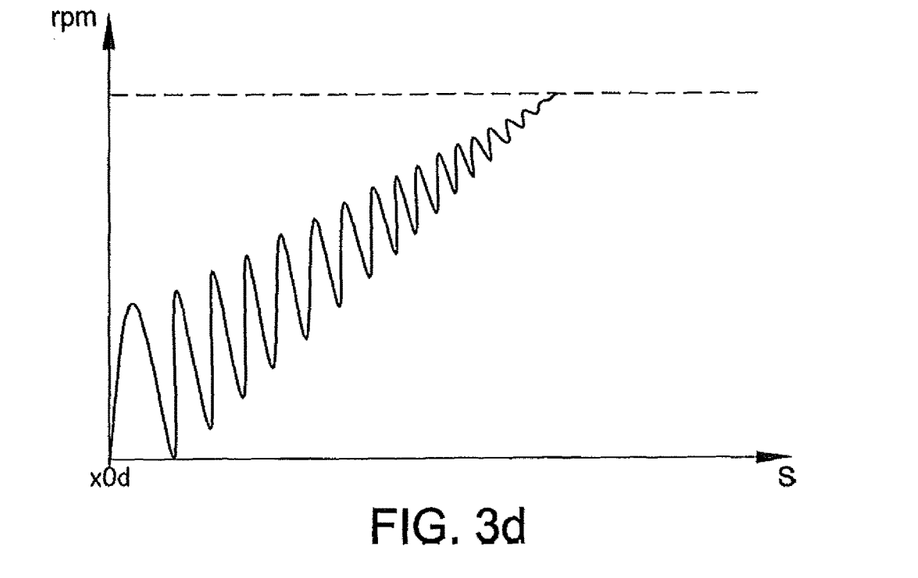

The embodiment in FIG. 3d discloses schematic clutch judder characteristics for a gear wherein the clutch judder frequency reaches a maximum value initially at, vehicle take-off xOd and subsequently decrease with time and increased rotational speed. The clutch judder characteristics shown in FIG. 3d may be the characteristics of clutch judder related to a rough and/or quick friction clutch 5 engagement. In order to be able to detect such clutch judder it may be necessary w first rule out that the clutch judder is related to the engine.

FIGS. 3a to 3d are simplified schematic disclosures of respective clutch judder. In reality more than one type of clutch judder may occur simultaneously or at least sequentially. If so, engine related clutch judder may first be identified and excluded from the judder analysis in order to subsequently be able to detect additional types of clutch judder.

Referring now to FIG. 4a, disclosing an example of a prior art friction clutch 5. The friction clutch 5 is configured to be connected to an engine 3, via a crankshaft 41, to a transmission 4, via an input shall 42, wherein the friction clutch 5 can control the power (torque) transferred from the engine 3 to the transmission 4. The input shaft 41 is arranged by a hub 46 to a clutch disc 49 comprising a friction plate 48, wherein the input shaft 42 and the friction plate 48 rotate synchronously. The crankshaft 41 is fixedly arranged to the flywheel 47, wherein the crankshaft 41 and the flywheel 47 rotate synchronously. A clutch releasing means 43, comprising a release bearing 50, a diaphragm spring 44 and a pressure plate 45, is arranged concentrically of the input shaft 42. According to the embodiment of the present disclosure shown in FIG. 4a the end of the input shaft 42 that not is coupled to the transmission 3 is rotatably arranged to the crankshaft 41 by a bearing 52, wherein the input shaft 42 may rotate in relation to the crankshaft 41 via said bearing 52. The friction plate 48 and the releasing means 43 is at least partially surrounded by a clutch housing 51.

The friction clutch 5 is configured such that when the clutch is engaged, e.g. due to a request from a driver, the release bearing 50 is moved such that the pressure plate 45 abuts the friction plate 48, wherein the friction plate 48 engage with the flywheel 47. When the flywheel 47 and the friction plate 48 are engaged the power from the engine 3 is transferred from the crankshaft 41, via the engaged flywheel 47 and friction plate 48, to the input shaft 42. The pressure plate 45 and the diaphragm spring 44 will rotate with the same rotational speed as the crankshaft 41. The diaphragm spring 44 is arranged to the release bearing 50 by a bearing, e.g. of roller bearing type, wherein the release bearing 50 not will rotate with neither the crankshaft 41 nor the input shaft 42.

The functionality of a friction clutch 5 is not part of the disclosure per se and is considered to be part of general knowledge.

In FIGS. 4a and 4b the influence of the angular tolerance between the pressure plate 45 and the flywheel 47 is disclosed, in FIG. 4a a first, in FIG. 4a shown in a higher position, portion of the pressure plate 45 abuts the friction plate 48 whereas a second, lower portion of the pressure plate 45 is free from the friction plate 48. In FIG. 4b the release bearing 50' is skewed (which is excessively shown in FIG. 4b) which has the effect that the second, lower portion of the pressure plate 45 is pushed towards the friction plate 48 such that the second, lower portion of the pressure plate 45 and the friction plate 48 abuts.

The embodiment shown in FIG. 4a has the effect that the flywheel 47 and the friction plate 48 engage at the first, higher portion of the pressure plate 45, but not at the second, lower portion of the pressure plate 45. The unsymmetrical engagement of the friction clutch 5 may cause oscillations, which if coinciding with the resonance frequency at the current gear may result in clutch judder. The position where the first, higher portion of the pressure plate 45 abuts the friction plate 48 is the position where the pressure plate 45 and the flywheel 47 are closest, and this portion will rotate with the rotation of the crankshaft 41. The configuration of the embodiment shown in FIG. 4a may cause the situation disclosed in FIG. 3b.

Corresponding y, in the embodiment in FIG. 4b the position where the second, lower portion of the pressure plate 45 abuts the friction plate 48 is the position where the pressure plate 45' and the flywheel 47 are closest in the embodiment shown in FIG. 4b this portion will be fixed with the release bearing 50'. The configuration of the embodiment shown in FIG. 4b may cause the situation disclosed in FIG. 3c.

These defects in the construction affecting the angular tolerance between the pressure plate 45 and the flywheel 47 may e.g. be due to the difficulties in obtaining perfect tolerances e.g. when manufacturing constituent components such as e.g. when manufacturing the flywheel 47, the pressure plate 45 or the friction plate 48.

It is to be understood that the present disclosure is not limited to the embodiments described, above and illustrated in the drawings; rather, the skilled person will recognize that many changes and modifications may be made within the scope of the appended claims.

The reference signs of all previously disclosed figures are used throughout the description of respective figure.

The invention claimed is:

1. A method for operating a powertrain of a motor vehicle, wherein the powertrain comprises an internal combustion engine, a transmission and a friction clutch arranged therebetween in order to control a power flow between the internal combustion engine and the transmission, wherein the method comprises the steps of:
    detecting clutch judder, wherein the detection of clutch judder is based on at least one predetermined vehicle variable,
    analysing clutch judder characteristics by evaluating the at least one predetermined vehicle variable in order to determine a type of clutch judder,
        select a judder countermeasure, based on the determined type of clutch judder, and
        execute the selected judder countermeasure,
    wherein the determination of the type of clutch judder is based on a clutch judder frequency, and wherein the determination of the type of clutch judder further comprises the steps of:
        comparing the clutch judder frequency with an engine frequency,
        evaluating if the clutch judder frequency matches the engine frequency or matches half the engine frequency,
    wherein, in the determination of the type of clutch judder, if the clutch judder frequency matches the engine frequency or half the engine frequency, it is determined that the clutch judder is engine related,
    wherein the determination of the type of clutch judder comprises, during engagement of the friction clutch,
        evaluating whether a highest rotational acceleration of a power transferring part in the powertrain started from zero rotational speed, and
        evaluating whether the clutch judder is engine related,
    wherein, in the determination of the type of clutch judder, the clutch judder is related to the engagement of the friction clutch when
        it is determined that the clutch judder is not engine related, and
        the highest rotational acceleration of the power transferring part in the powertrain started at zero rotational speed,
    wherein the selected judder countermeasure is selected from a group of judder countermeasures comprising:
    increasing a rotational speed of the internal combustion engine during a start-up period,
    avoiding starting on specific gears,
    adjusting the rotational speed of the internal combustion engine at which the friction clutch is engaged,
    adjusting a starting position of the friction clutch, and/or
    decreasing a length of time for passing critical internal combustion engine rotational speeds relative to a normal time for passing the critical internal combustion engine rotational speeds.

2. The method according to claim 1, wherein the powertrain comprises a pressure plate and a flywheel, and wherein the determination of the type of clutch judder further comprises the steps of:
    comparing the clutch judder frequency with a rotational speed difference frequency dependent on a rotational speed difference between rotational speed of the power transferring part in the powertrain and the rotational speed of the internal combustion engine,
    evaluating if the clutch judder frequency matches the speed difference frequency,
    wherein, in the determination of the type of clutch judder, if the clutch judder frequency matches the speed difference frequency, it is determined that the clutch judder is related to an angular tolerance between the pressure plate and the flywheel.

3. The method according to claim 1, wherein the friction clutch further comprises a release bearing and a diaphragm spring, and wherein the determination of the type of clutch judder further comprises the steps of:
    comparing the clutch judder frequency with the rotational speed of the power transferring part in the powertrain,
    evaluating if the clutch judder frequency matches the rotational speed of the power transferring part in the powertrain,
wherein, in the determination of the type of clutch judder, if the clutch judder frequency matches the rotational speed of the power transferring part in the powertrain, it is determined that the clutch judder is related to an angular tolerance between the release bearing and the diaphragm spring.

4. The method according to claim 1 wherein the method further comprises the steps of, when clutch judder is detected:
    collecting information from an acceleration sensing means of the vehicle, combining information from the acceleration sensing means with clutch judder characteristics, and evaluating a criticality of the clutch judder.

5. A computer comprising a computer program for performing the steps of claim 1 when the program is run on the computer.

6. A non-transitory computer readable medium carrying a computer program for performing the steps of claim 1 when the program product is run on a computer.

7. An electronic control unit for operating the powertrain, the electronic control unit being configured to perform the steps of the method according to claim 1.

8. A vehicle powertrain comprising a control unit for operating the powertrain, an internal combustion engine, a transmission and a friction clutch arranged therebetween in order to control a power flow between the internal combustion engine and the transmission, wherein the control unit is configured to:

detect clutch judder, wherein the detection of clutch judder is based on at least one predetermined vehicle variable, analyse clutch judder characteristics by evaluating the at least one predetermined vehicle variable in order to determine a type of clutch judder, select a judder countermeasure, based on determined type of clutch judder, and execute the selected judder countermeasure, wherein the determination of the type of clutch judder is based on a clutch judder frequency, and wherein the determination of the type of clutch judder further comprises comparing the clutch judder frequency with an engine frequency, evaluating if the clutch judder frequency matches the engine frequency or matches half the engine frequency, wherein, in the determination of the type of clutch judder, if the clutch judder frequency matches the engine frequency or half the engine frequency, it is determined that the clutch judder is engine related, wherein the determination of the type of clutch judder comprises, during engagement of the friction clutch, evaluating whether a highest rotational acceleration of a power transferring part in the powertrain started from zero rotational speed, evaluating whether the clutch judder is engine related, wherein in the determination of the type of clutch judder, the clutch judder is related to the engagement of the friction clutch when it is determined that the clutch judder is not engine related, and the highest rotational acceleration of the power transferring part in the powertrain started at zero rotational speed, wherein the selected judder countermeasure is selected from a group of judder countermeasures comprising:

increasing a rotational speed of the internal combustion engine during a start-up period, avoiding starting on specific gears, adjusting the rotational speed of the internal combustion engine at which the friction clutch is engaged, adjusting a starting position of the friction clutch, and/or decreasing a length of time for passing critical internal combustion engine rotational speeds relative to a normal time for passing the critical internal combustion engine rotational speeds.

* * * * *